(12) United States Patent
Albrecht et al.

(10) Patent No.: US 11,168,971 B2
(45) Date of Patent: Nov. 9, 2021

(54) SYSTEMS AND METHODS FOR EVALUATING A SURFACE OF A BORE FORMED IN A STRUCTURE

(71) Applicant: The Boeing Company, Chicago, IL (US)

(72) Inventors: Mark Albrecht, Lake Stevens, WA (US); Kwok Tung Chan, Seattle, WA (US); Everette D. Gray, Seattle, WA (US)

(73) Assignee: The Boeing Company, Chicago, IL (US)

( * ) Notice: Subject to any disclaimer, the term of this patent is extended or adjusted under 35 U.S.C. 154(b) by 339 days.

(21) Appl. No.: 16/389,164

(22) Filed: Apr. 19, 2019

(65) Prior Publication Data

US 2020/0333126 A1 Oct. 22, 2020

(51) Int. Cl.
*G01B 5/12* (2006.01)

(52) U.S. Cl.
CPC ...................... *G01B 5/12* (2013.01)

(58) Field of Classification Search
CPC ........................................................ G01B 5/12
USPC .................................................. 33/542, 543
See application file for complete search history.

(56) References Cited

U.S. PATENT DOCUMENTS

| | | | |
|---|---|---|---|
| 4,414,508 A | 11/1983 | Davis et al. | |
| 5,207,005 A * | 5/1993 | Amos | G01B 7/28 324/219 |
| 5,615,489 A * | 4/1997 | Breyer | G01B 5/012 33/503 |
| 9,518,851 B2 | 12/2016 | Bergman et al. | |
| 10,161,914 B2 | 12/2018 | Bergman et al. | |
| 2006/0101660 A1* | 5/2006 | Takanashi | G01B 5/0002 33/503 |
| 2008/0083127 A1* | 4/2008 | McMurtry | G01B 21/045 33/502 |
| 2008/0235969 A1* | 10/2008 | Jordil | G01B 5/008 33/503 |
| 2016/0032710 A1* | 2/2016 | Hu | E21B 47/08 33/544.2 |
| 2018/0023945 A1* | 1/2018 | Mariller | G01B 5/14 33/832 |

* cited by examiner

*Primary Examiner* — George B Bennett
(74) *Attorney, Agent, or Firm* — Walters & Wasylyna LLC

(57) ABSTRACT

A method for evaluating a surface of a bore formed in a structure, where the bore defines a bore axis. The method includes moving a probe at least partially through the bore in a first lineal direction about the bore axis while simultaneously rotating the probe about the bore axis. The probe includes a contact element contacting the surface of the bore at a plurality of first contact points as the probe moves in the first lineal direction.

20 Claims, 11 Drawing Sheets

SYSTEMS AND METHODS FOR EVALUATING A SURFACE OF A BORE FORMED IN A STRUCTURE

FIELD

This application relates to bore metrology and, more particularly, to the use of helical motion for evaluating a surface of a bore formed in a structure and, even more particularly, to the use of helical motion while measuring spatial coordinates of contact points on a surface of a bore.

BACKGROUND

The interior surface of a bore formed in a structure may, for a variety of reasons, vary from its intended dimensions. Inconsistencies in manufacturing processes may result in a bore that is tapered or otherwise non-compliant. Further, use of the structure may cause the bore to become eroded, damaged or uneven in some manner. A compromised bore may result in additional complications in manufacturing, such as the inability to install a fastener, or even preclude further use of the structure. As such, the ability to inspect the interior surface of a bore is of critical importance to ensure that the bore is sufficient for its intended application.

Contact probes (e.g., probes that collect data by physically making contact with a surface) are a type of measuring tool that may be used to evaluate the surface of a bore. Their ability to do so is dependent on the total number of contact elements on the contact probe as well as their method of operation. Typically, contact probes require numerous strokes into and out of the bore to adequately characterize the surface along the entire circumference of the bore, which adds undesired time to production.

Accordingly, those skilled in the art continue with research and development efforts in the field of bore metrology.

SUMMARY

In one example, the disclosed method for evaluating a surface of a bore formed in a structure includes moving a probe at least partially through the bore in a lineal direction along a bore axis of the bore, while simultaneously rotating the probe about the bore axis. The probe includes a contact element that contacts the surface of the bore at a plurality of contact points as the probe moves in the lineal direction.

In another example, the disclosed method for evaluating a surface of a bore formed in a structure includes moving a probe at least partially through the bore in a first lineal direction along a bore axis of the bore, while simultaneously rotating the probe about the bore axis. The probe includes a contact element that contacts the surface of the bore at a plurality of first contact points as the probe moves in the first lineal direction. The probe then moves at least partially through the bore in a second lineal direction along the bore axis, while simultaneously rotating the probe about the bore axis. The second lineal direction is opposite the first lineal direction. The contact element contacts the surface of the bore at a plurality of second contact points as the probe moves in the second lineal direction.

In another example, the disclosed method for evaluating a surface of a bore formed in a structure includes (1) moving a probe at least partially through the bore in a first lineal direction along a bore axis of the bore, while simultaneously rotating the probe at least 360 degrees about the bore axis, the probe including a contact element contacting the surface of the bore at a plurality of first contact points as the probe moves in the first lineal direction; (2) phase shifting the probe about the bore axis after the moving the probe at least partially through the bore in the first lineal direction; and (3) after the phase shifting, moving the probe at least partially through the bore in a second lineal direction along the bore axis, while simultaneously rotating the probe at least 360 degrees about the bore axis, the second lineal direction being opposite of the first lineal direction, the contact element contacting the surface of the bore at a plurality of second contact points as the probe moves in the second lineal direction.

In one example, the disclosed system for evaluating a surface of a bore formed in a structure includes a probe that is insertable into the bore and a carriage assembly that is connected to the probe. The probe includes a contact element positioned to contact the surface of the bore when the probe is inserted. The carriage assembly is adapted for linear movement along a bore axis of the bore and rotational movement about the bore axis.

Other examples of the disclosed systems and methods for evaluating a surface of a bore formed in a structure will become apparent from the following detailed description, the accompanying drawings and the appended claims.

DETAILED DESCRIPTION

Figure 1:
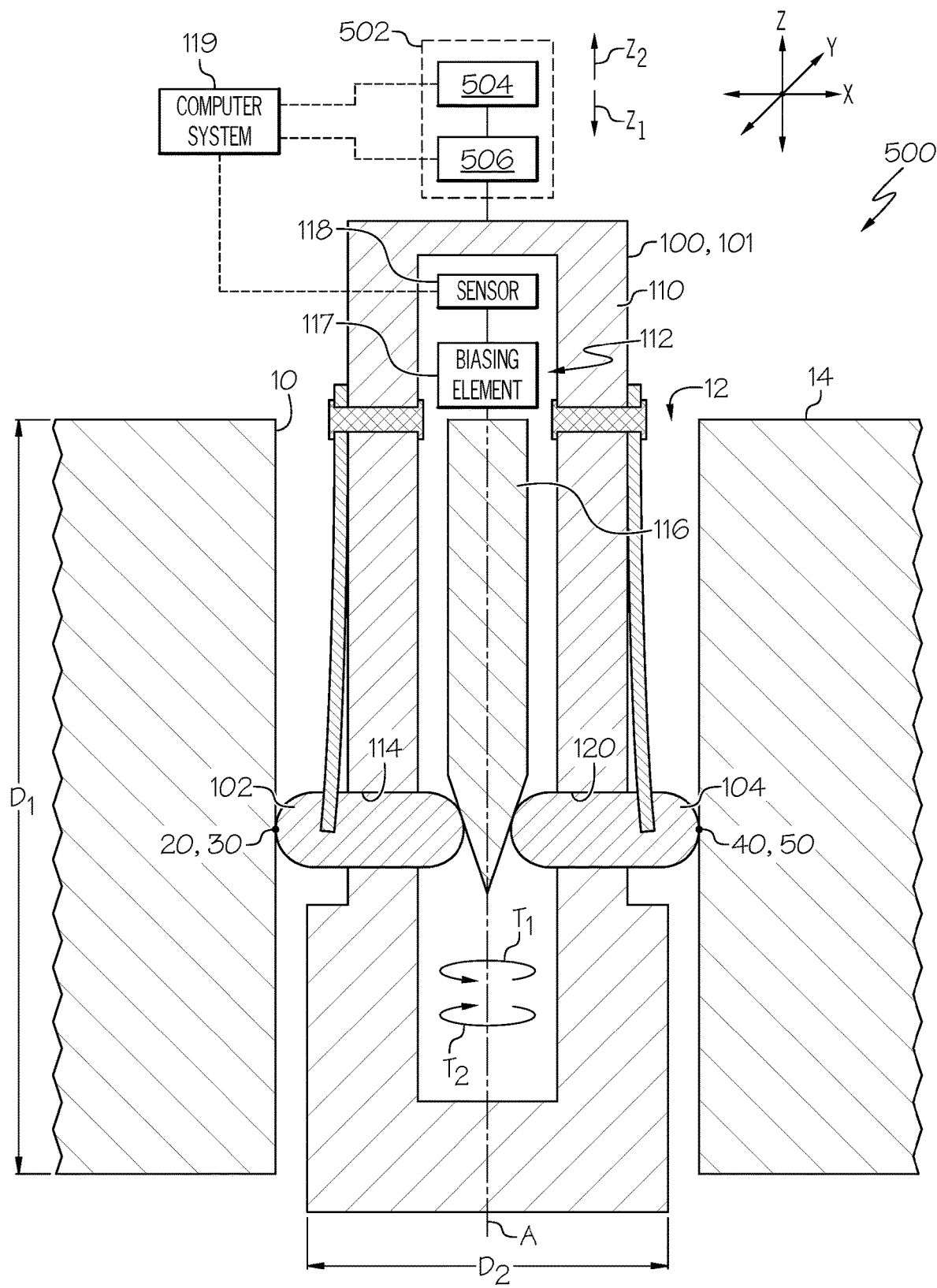
FIG. 1 is a side elevational view, in cross-section, of an example of the disclosed system for evaluating a surface of a bore formed in a structure.

The following detailed description refers to the accompanying drawings, which illustrate specific examples described by the present disclosure. Other examples having different structures and operations do not depart from the scope of the present disclosure. Like reference numerals may refer to the same feature, element, or component in the different drawings.

Illustrative, non-exhaustive examples, which may be, but are not necessarily, claimed, of the subject matter according the present disclosure are provided below. Reference herein to "example" means that one or more feature, structure, element, component, characteristic, and/or operational step described in connection with the example is included in at least one embodiment and/or implementation of the subject matter according to the present disclosure. Thus, the phrases "an example," "another example," "one or more examples," and similar language throughout the present disclosure may, but do not necessarily, refer to the same example. Further, the subject matter characterizing any one example may, but does not necessarily, include the subject matter characterizing any other example. Moreover, the subject matter characterizing any one example may be, but is not necessarily, combined with the subject matter characterizing any other example.

Referring to FIG. 1, an example of a system for evaluating the surface of a bore, generally designated 500, is disclosed. The system 500 includes a structure 14, a bore 12 formed in the structure 14, a probe 100 insertable into the bore 12, and a carriage assembly 502 connected to the probe 100. The structure 14 may include, or take the form of, any solid body having any shape and dimensions, depending on the particular purpose of the structure 14. The structure 14 may be made of any one of (or combination of) various suitable materials, such as a metallic material, a plastic material, a composite material, a fiber-reinforced plastic, and the like. The structure 14 may be monolithic (a single piece of continuous material) or may be a combination material (such as a composite structure). The bore 12 may extend through a portion of the structure 14 or entirely through it (e.g., a through-bore). The bore 12 may be formed in the structure 14 by any one of various feature-forming techniques, such as machining (e.g., drilling or boring), other subtractive manufacturing operations, or during formation such as during an additive manufacturing process.

Once formed, the bore defines a bore length $D_1$, a bore width $D_2$, and a bore axis A extending through the length $D_1$ of the bore 12. The bore width $D_2$, defined as the distance between two opposed (e.g., diametrically opposed) points on the surface 10 of the bore 12, may be uniform along the length $D_1$ of the bore 12 or it may be irregular. As such, the bore 12 may define a variety of three-dimensional shapes. In some circumstances, the bore width $D_2$ may be constant along the bore axis A, such as for a cylindrical bore. In some circumstances, the bore width $D_2$ may vary along the bore axis A, such as for a tapered, worn, or damaged bore. In some circumstances, the bore width $D_2$ may be constant at a given location along the bore axis A, such as for a bore having a circular cross-section, viewed along the bore axis A. In some circumstances, the bore width $D_2$ may vary at a given location along the bore axis A, such as for a bore having an ovular or elliptical cross-section, viewed along the bore axis A.

The bore width $D_2$ may be measured by inserting a probe 100 into the bore 12 such that a contact element 102 of the probe 100 comes into contact with the surface 10 of the bore 12. As shown in FIG. 1, a plug gauge 101 is a type of contact probe that may be suitable for this purpose. The plug gauge 101 may include a housing 110 configured to be at least partially inserted within the bore 12. The housing 110 may define an internal volume 112 within which at least a portion of the various operating components of the plug gauge 101 may be internally housed and protected. As shown, the plug gauge 101 may include a plunger 116, a biasing element 117 and a sensor 118 at least partially received within the internal volume 112. The housing 110 may also define two openings 114, 120 into the internal volume 112 where two diametrically opposed contact elements 102, 104 may be at least partially received. Those skilled in the art will appreciate, however, that plug gauges 101 with only one contact element or with more than two contact elements may be used without departing from the scope of the present disclosure. Likewise, plug gauges 101 with differing contact element positions or plug gauges with more than one plunger may be included within the scope of the present disclosure as well.

In operation, the plunger 116 may be biased into engagement with the contact elements 102, 104 by way of a biasing element 117, thereby urging the contact elements 102, 104 radially outward from the housing 110 through the openings 114, 120. The biasing element 117 may be any one of various suitable devices such as a mechanical spring, an actuator, and the like. In this way, the contact elements 102, 104 may be urged into contact with the bore the surface 10 of the bore 12 at diametrically opposed points. A sensor 118 contained within the housing 110 may detect the position of the contact elements 102, 104 (e.g., by monitoring relative movement of the plunger 116) and may send readings (e.g., voltage signals) to a computer system 119.

Still referring to FIG. 1, the probe 100 is connected to a carriage assembly 502 that controls the movement of the probe 100. The carriage assembly 502 is configured to move the probe 100 linearly along the bore axis A, as well as rotationally about the bore axis A. In one example, the carriage assembly includes a linear motion device 504, such as an actuator, for effecting linear movement of the probe 100 along the bore axis A. In another example, the carriage assembly 502 includes a motor 506 for effecting rotational movement of the probe 100 about the bore axis A. In yet another example, the carriage assembly includes both a linear motion device 504 and a motor 506 for effecting linear and rotational movement of the probe 100 along and about the bore axis A.

The lineal movement of the probe 100 along the bore axis A may be defined in terms of a first lineal direction $Z_1$ and a second lineal direction $Z_2$, the second lineal direction $Z_2$ being opposed from the first lineal direction $Z_1$. Depending on the starting location of the probe 100, the carriage assembly 502 may move the probe 100 in a first lineal direction $Z_1$ into the bore 12 and then in a second lineal direction $Z_2$ out of the bore 12. The distance traveled by the probe 100 into or out of the bore 12 may need not be for the entire length $D_1$ of the bore 12. In one example, the probe 100 may be moved only partially within the bore 12. In another example, the probe 100 may be moved along the entire length $D_1$ of the bore 12. Those skilled in the art will appreciate that the movement of the probe 100 within the bore 12 may be a multi-faceted process and include repeated movements of variable distance in both the first and second lineal directions $Z_1$, $Z_2$.

The velocity in which the probe 100 moves in either a first or second lineal direction $Z_1$, $Z_2$ may vary as well. In an example, the probe 100 moves in a first lineal direction $Z_1$ at a substantially constant velocity. In an example, the probe 100 moves in a first lineal direction $Z_1$ at a variable velocity (e.g., speeding up or slowing down). In an example, the probe 100 moves in a second lineal direction $Z_2$ at a substantially constant velocity. In an example, the probe 100 moves in a second lineal direction $Z_2$ at a variable velocity. Those skilled in the art will appreciate that various methods of operation may include any combination of the aforementioned examples.

Figure 2:
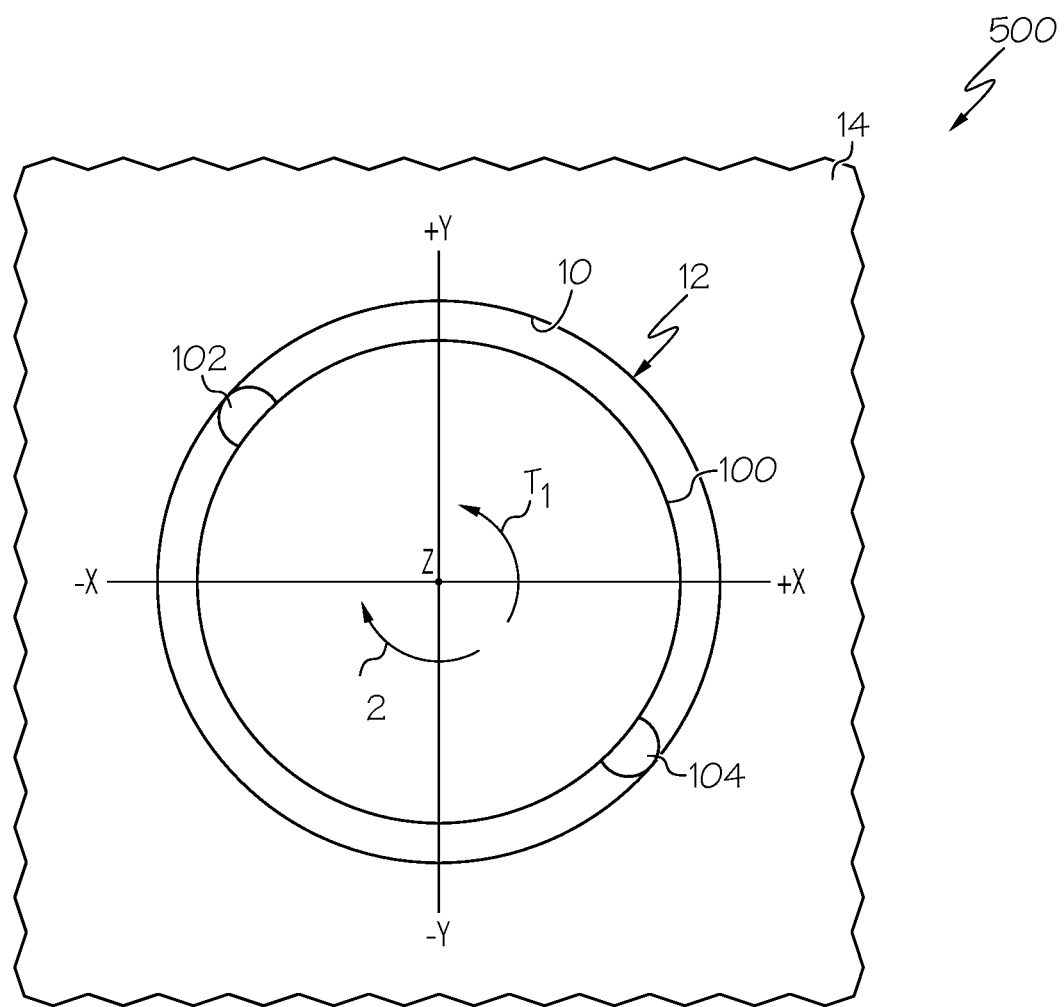
FIG. 2 is a top plan view of a portion of the system shown in FIG. 1.

The rotational movement of the probe 100 about the bore axis A may be defined in terms of a first angular direction $T_1$ and a second angular direction $T_2$ opposed from the first angular direction $T_1$. As illustrated in FIG. 2, which shows one example, the first angular direction $T_1$ may be counter-clockwise about the bore axis A and the second angular direction $T_2$ may be clockwise about the bore axis A. In another example, the first angular direction $T_1$ may be clockwise about the bore axis A and the second angular direction $T_2$ may be counter-clockwise about the bore axis A.

The degree of rotational movement in either the first or second angular direction $T_1$, $T_2$ may be any conceivable distance about the bore axis A. In one example, the probe 100 is rotated about the bore axis A at least 90 degrees. In one example, the probe 100 is rotated about the bore axis A at least 180 degrees. In one example, the probe 100 is rotated about the bore axis A at least 270 degrees. In one example, the probe 100 is rotated about the bore axis A at least 360 degrees. In one example, the probe 100 is rotated about the bore axis A at least 720 degrees.

The angular velocity of rotational movement may also vary. In one example, the probe 100 may rotate in a first angular direction $T_1$ at a substantially constant velocity. In one example, the probe 100 may rotate in a first angular direction $T_1$ at a variable velocity (e.g., speeding up or slowing down). In one example the probe 100 may rotate in a second angular direction $T_2$ at a substantially constant velocity. In one example, the probe 100 may rotate in a second angular direction $T_2$ at a variable velocity.

The rotation of the probe 100 may be performed either separate from, or simultaneously with, the lineal movement of the probe 100. When the rotation of the probe 100 is separately performed from the lineal movement of the probe 100 (e.g., the probe 100 is being held at a constant lineal position along the bore 12), the probe 100 is said to have been "phase shifted." The probe may be phase shifted to any particular angle $\phi$ about the bore axis A. In one example, the probe 100 may phase shifted about 5 degrees to about 180 degrees about the bore axis A. In another example, the probe 100 may phase shifted about 90 degrees to about 180 degrees about the bore axis A. Phase shifting may be performed by combining any of the aforementioned examples of angular direction, degrees of rotational movement, and angular velocities.

Alternatively, when the rotation of the probe 100 is performed simultaneously with lineal movement of the probe 100, the probe 100 may move through the bore 12 in a helical pattern. Any combination of the aforementioned lineal directions, distances, and velocities may be performed simultaneously with any combination of the aforementioned angular directions, degrees of rotational movement, and angular velocities to produce this helical pattern. Further, without being bound by any particular theory, it is believed that simultaneous lineal and rotational movement presents an improvement over current methods of contact probe operation because the simultaneous lineal and rotational movement of the probe 100 allows for out-of-round data collection without the need for additional strokes of the probe 100.

Figure 3:
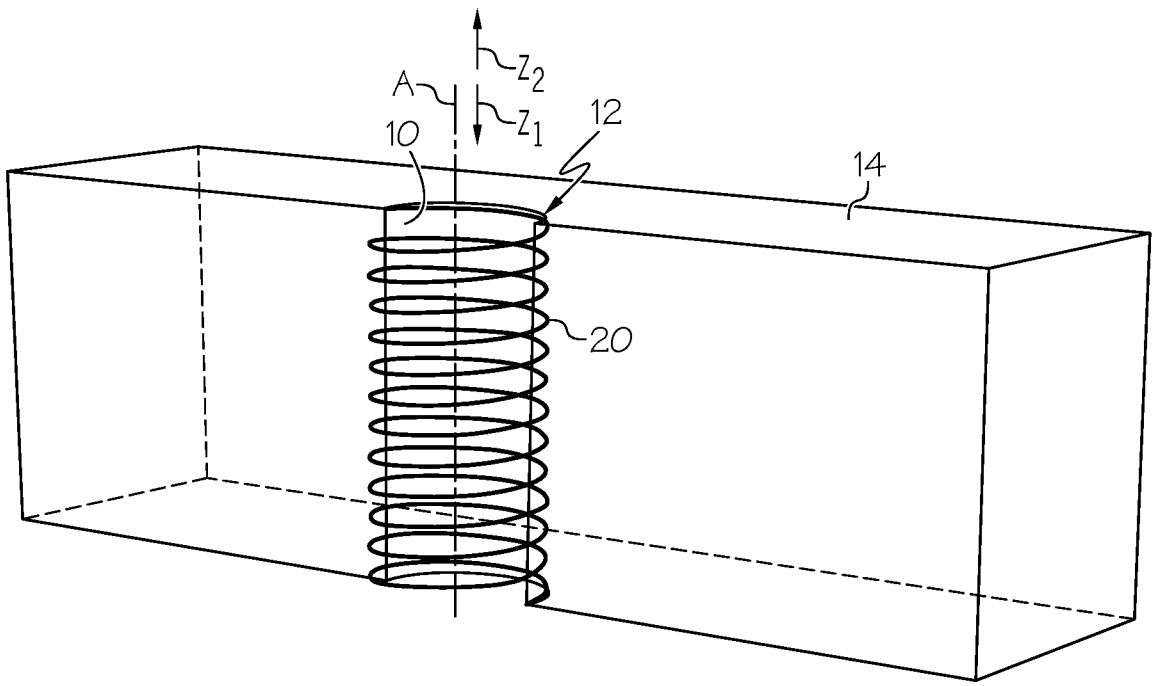
FIG. 3 is a side perspective view, in cross-section, of a portion of the system of FIG. 1 showing a contact element contacting the surface of the bore at a plurality of first contact points as the probe moves in a first lineal direction.
Figure 4:
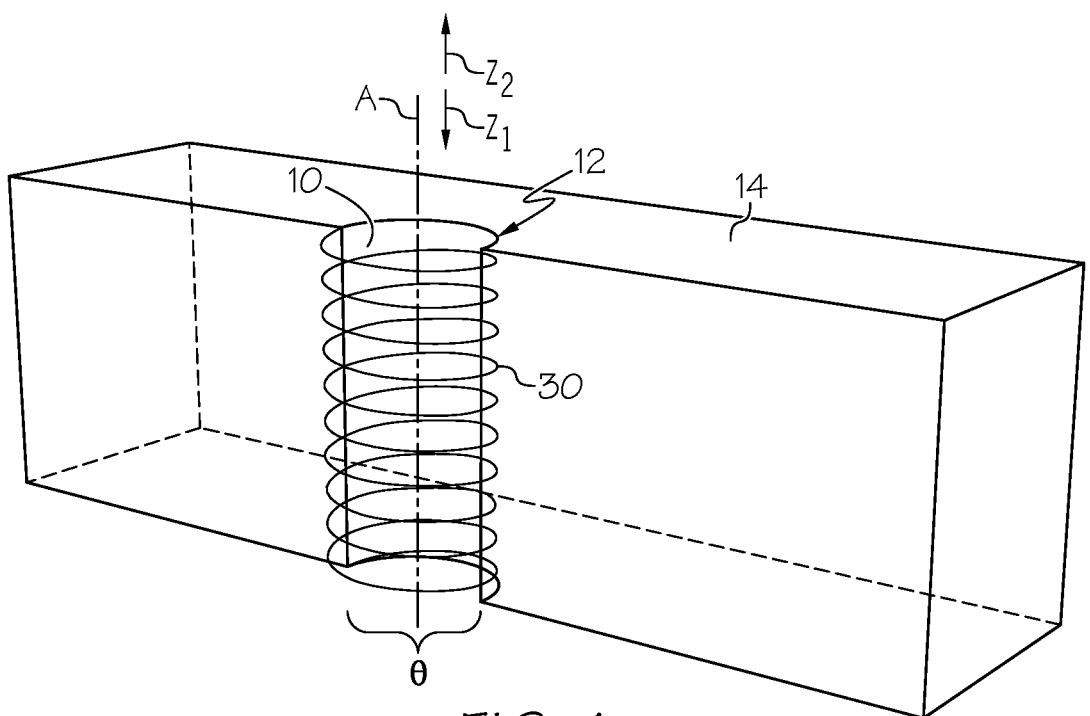
FIG. 4 is a side perspective view, in cross-section, of a portion of the system of FIG. 1 showing a contact element contacting the surface of the bore at a plurality of second contact points as the probe moves in a second lineal direction.
Figure 5:
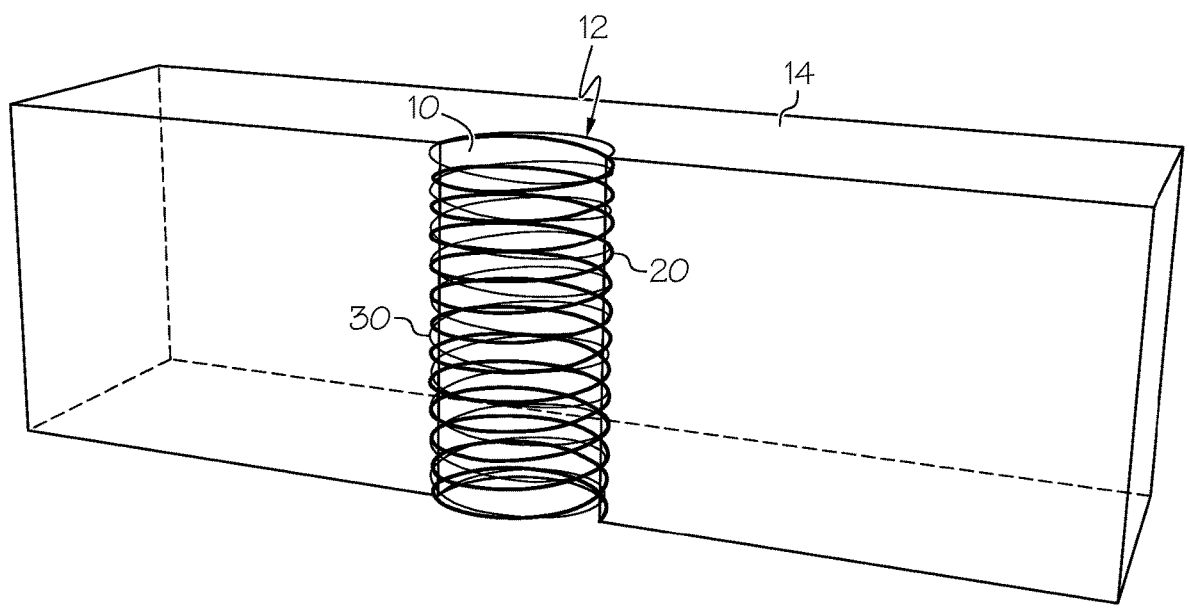
FIG. 5 is a side perspective view, in cross-section, showing the plurality of first contact points of FIG. 3 superimposed with the plurality of second contact points of FIG. 4.

As shown in FIGS. 3, 4 and 5, instances of phase shifting as well as simultaneous angular and lineal movement may be combined into a single method of operation.

Referring to FIG. 3, the path of a single contact element 102 on a probe 100 is shown as the probe 100 is moved in a first lineal direction $Z_1$ into a bore 12, while simultaneously being rotated in a first angular direction $T_1$. This contact element 102 makes contact with the surface 10 of the bore 12 at a plurality of first contact points 20 corresponding to its path into the bore 12.

Referring to FIG. 4, the probe 100 is then phase shifted by an angle $\phi$ before being moved in a second lineal direction $Z_2$ out of the bore 12, while simultaneously continuing to rotate in the first angular direction $T_1$. The contact element 102 makes contact with the surface 10 of the bore 12 at a plurality of second contact points 30 corresponding to the path it takes out of the bore 12, a majority of the plurality of second contact points 30 being different from the plurality of the first contact points 20.

Referring to FIG. 5, the overall path of the contact element 102 into and out of the bore 12 is shown. The combination of the path shown in FIG. 3 and the path shown in FIG. 4 allows for a distribution of the pluralities of first and second contact points 20, 30 along the entire circumference of the bore 12 as well as the entire length $D_1$ of the bore 12.

In an example, the probe 100 may move through the bore 12 in a first lineal direction $Z_1$, while simultaneously rotating in a first angular direction $T_1$. While moving in the first lineal direction $Z_1$, a contact element 102 on the probe 100 may contact the surface 10 of the bore 12 at a plurality of first contact points 20. The probe 100 may then move in a second lineal direction $Z_2$, while simultaneously rotating in a second angular direction $T_2$, where the second lineal direction $Z_2$ is opposite the first lineal direction $Z_1$ and the second angular direction $T_2$ is opposite the first angular direction $T_1$. While moving in the second lineal direction $Z_2$, the contact element 102 may contact the surface 10 of the bore 12 at a plurality of second contact points 30.

In another example, the probe 100 may include two contact elements 102, 104 and may be operated in accordance to the method disclosed in FIGS. 3, 4 and 5. The first contact element 102 would contact the surface 10 of the bore 12 as previously described. The second contact element 104 would contact the surface 10 at a plurality of third contact points 40 as the contact element 104 is being simultaneously rotated in first angular direction $T_1$ about the bore axis A and moved in a first lineal direction $Z_1$. The second contact element 104 would then contact the surface 10 at a plurality fourth contact points 50 as it is being simultaneously rotated in the first angular direction $T_1$ and moved in a second lineal direction $Z_2$. Thus, increasing the number of contact elements results in an increased number of contact points on the surface 10. Those skilled in the art will appreciate that probes 100 having additional contact elements may produce a fifth and sixth, or a seventh and eighth plurality of contact points, and so forth.

Characterization of a bore 12 is performed by evaluating the positions of the contact points along the surface 10. The position of these contact elements may be detected by a sensor 118 either housed within or connected to the probe 100. Referring to the plug gauge illustrated in FIG. 1, this data may be detected by a sensor received within the internal volume of the housing and based on the displacement of the plunger in response to the displacement of the contact elements as the contact elements make contact with the surface 10.

Figure 6:
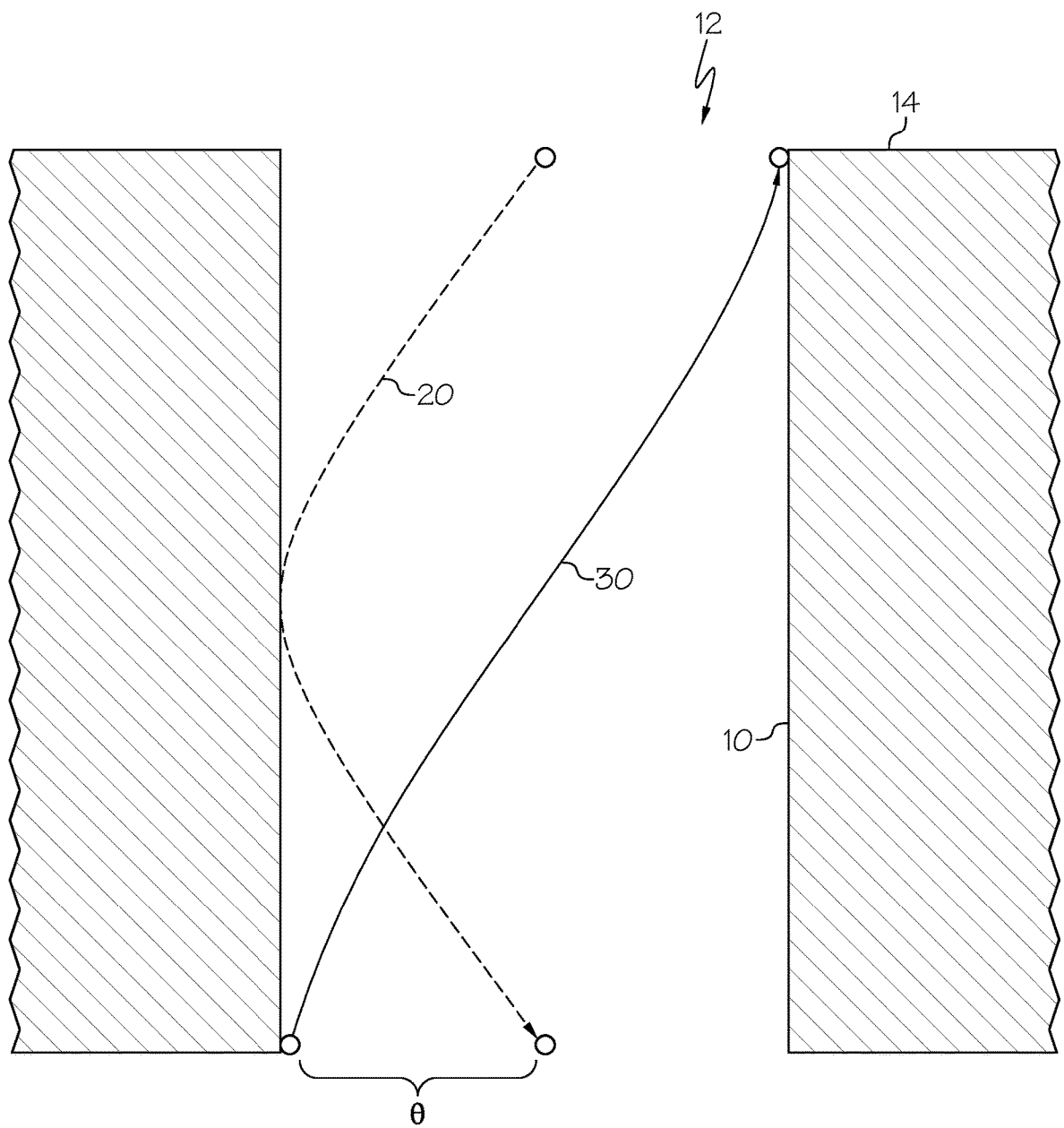
FIG. 6 is a side elevational view, in cross-section, showing a contact element contacting the surface of the bore at a plurality of first contact points as the probe moves in a first lineal direction and rotates 180 degrees and at a plurality of second contact points as the probe moves in a second lineal direction and rotates −180 degrees.
Figure 7:
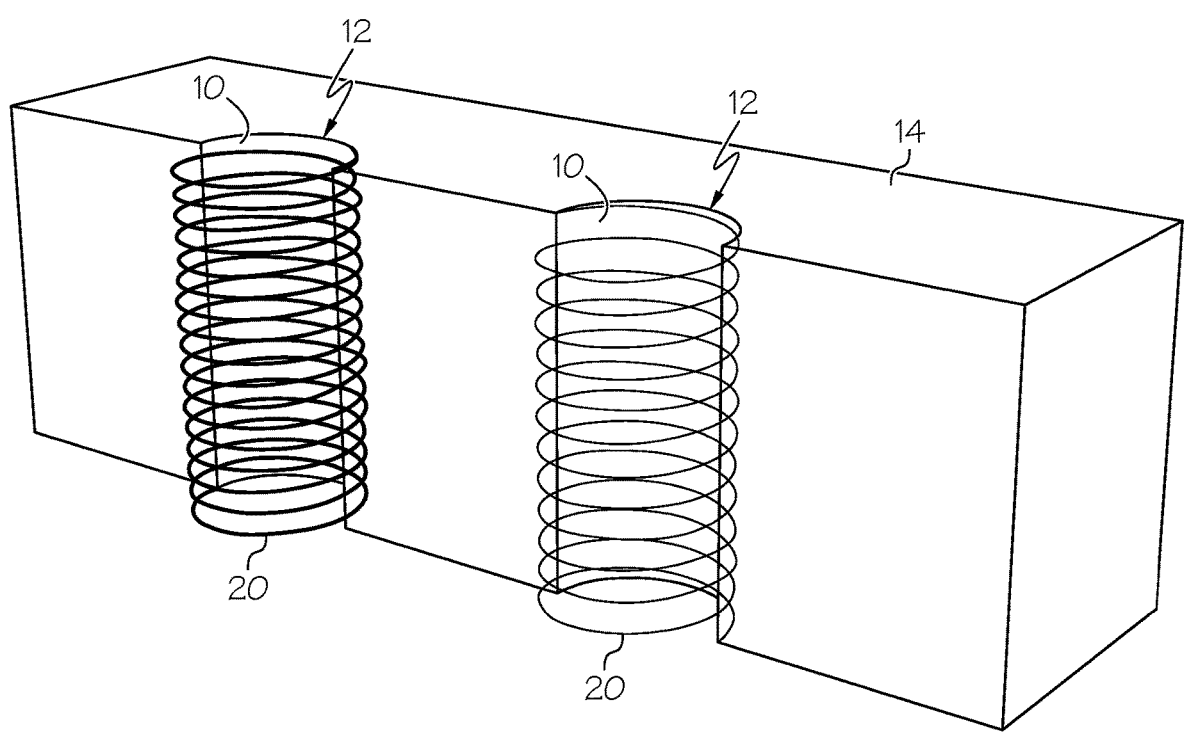
FIG. 7 is a side perspective view, in cross-section, showing a contact element contacting the surface of a first bore at a first linear velocity and angular velocity and another contact element contacting the surface of a second bore at a second, different linear and angular velocity, thereby forming two different helices.

The resolution of this characterization is directly proportional to the percentage of the surface 10 represented by contact points. Therefore, notwithstanding the number of contact elements on the probe 100, those skilled in the art will appreciate that resolution is a function of both lineal and angular velocity. As shown in FIGS. 6 and 7, decreasing lineal velocity and increasing angular velocity increases the total number of contact points established on the surface 10 as well as the distribution of those contact points across the surface 10.

Figure 8:
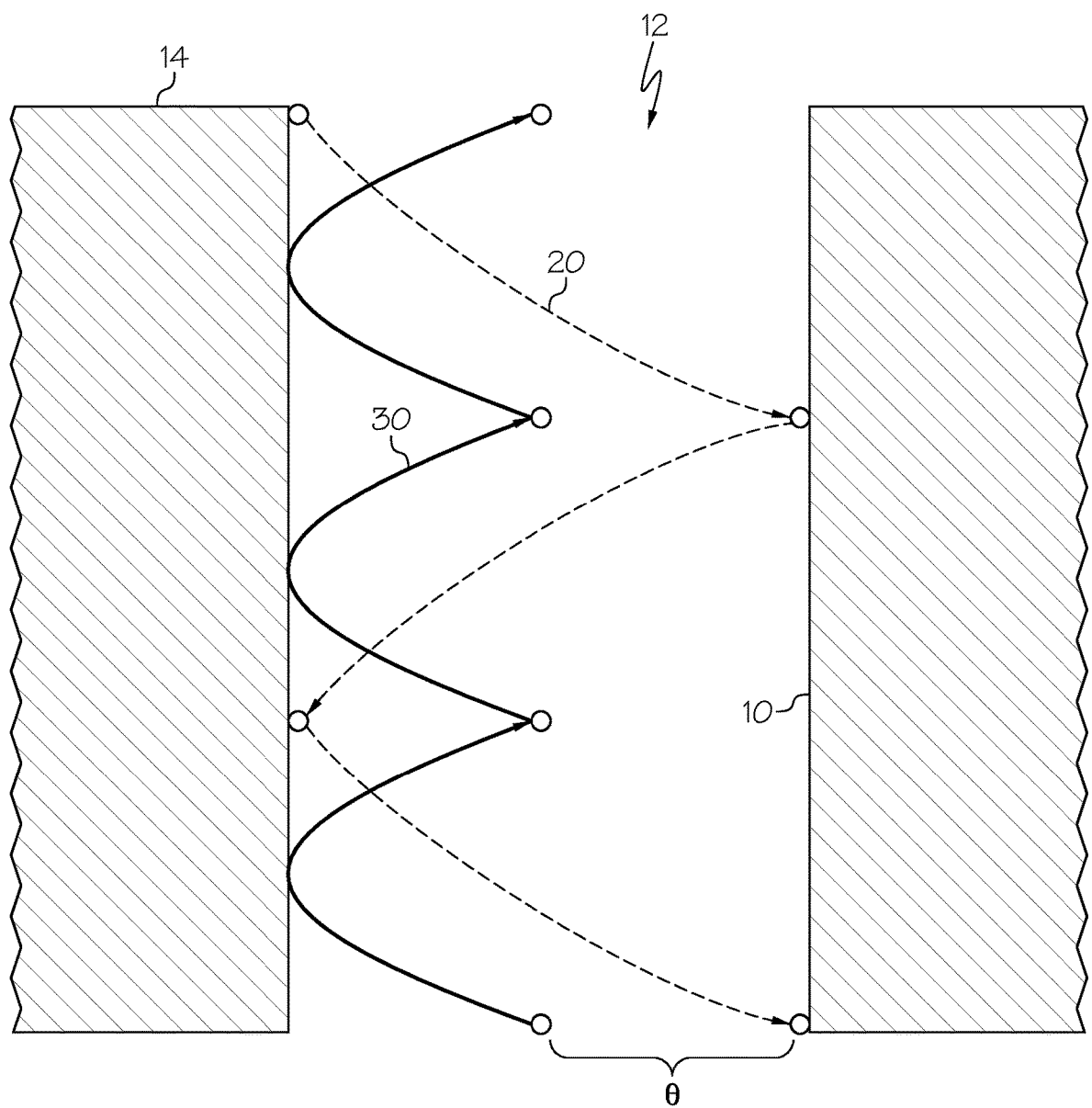
FIG. 8 is a side elevational view, in cross-section, showing a contact element oscillating as it moves through the bore.

Further, as shown in FIG. 8, the path of the probe 100 may be adjusted if greater resolution of a particular segment of a surface 10 is desired. As illustrated, the probe 100 may move into a bore 12 along a first lineal direction $Z_1$ while rotating in a first angular direction $T_1$. The probe 100 may then be phase shifted such that the contact element 102 is positioned to contact a particular segment of the surface 10. The probe 100 may then be moved in a second lineal direction $Z_2$ while oscillating between rotation in a first angular direction $T_1$ and a second angular direction $T_2$, within the confines of a particular angular range. As such, the plurality of second contact points 30 corresponding to the path formed by the probe 100 moving in the second lineal direction $Z_2$ are focused on a particular segment of the surface 10, thereby improving the resolution of that particular segment of the surface 10.

Figure 9:
FIG. 9 is a graphical depiction of the spatial coordinates collected by the system of FIG. 1.
Figure 9:

Referring to FIG. 9, the spatial coordinates 200 of the contact points may be determined. These spatial coordinates 200 may be in terms of the contact points' lineal position along the length $D_1$ of the bore 12 and their cartesian coordinates relative to the bore axis A. Alternatively, the spatial coordinates 200 may also be determined in terms of the contact points' angular position relative to the bore axis A and their radial distance from the bore axis A. As shown, these spatial coordinates 200 may reveal non-compliance along the surface 10 as evidenced by the inconsistent X-Y coordinates of the contact points at different lineal positions along the length $D_1$ of the bore 12.

Figure 10:
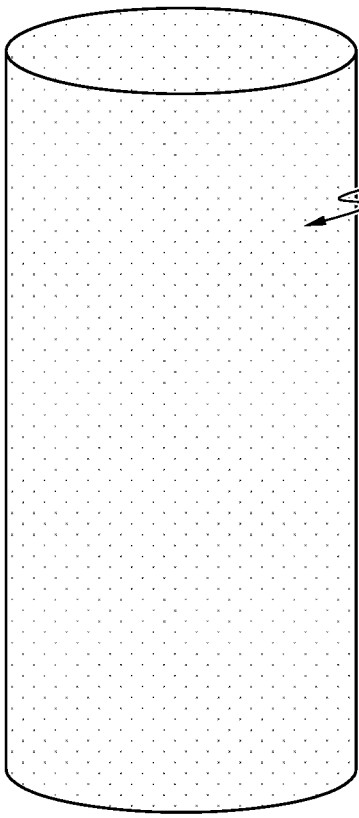
FIG. 10 is an example three-dimensional model generated based on the spatial coordinates collected by the system of FIG. 1.

Referring to FIG. 10, the spatial coordinates 200 of the contact points may then be used to generate a three-dimensional model 300 of the bore. Generation of this three-dimensional model 300 may be performed by a computer system 119 in communication with the probe 100 and/or the carriage assembly 502 connected to the probe 100. The spatial coordinates 200 used to generate this three-dimensional model 300 may be based on any number of any plurality of contact points. In one example, the three-dimensional model 300 may be based on a plurality of first contact points 20 and a plurality of second contact points 30, such as in the case of a probe 100 having one contact element 102 being moved in a first lineal direction $Z_1$ and a second lineal direction $T_1$. In another example, the three-dimensional model 300 may be based on a plurality of first contact points 20 and a plurality of second contact points 30, in addition to a plurality of third contact points 40 and a plurality of fourth contact points 50, such as in the case of a probe 100 having two contact elements 102, 104 being moved in a first lineal direction $Z_1$ and a second lineal direction $Z_2$.

The spatial coordinates 200 of the contact points may also be used to ascertain whether the bore is within pre-specified tolerance limits 400, 402. These tolerance limits may include an upper tolerance limit 400 and a lower tolerance limit 402. The upper tolerance limit 400 may represent the maximum allowable width $D_2$ of the bore 12 and the lower tolerance limit 402 may represent the minimum allowable width $D_2$ of the bore 12.

Figure 11:
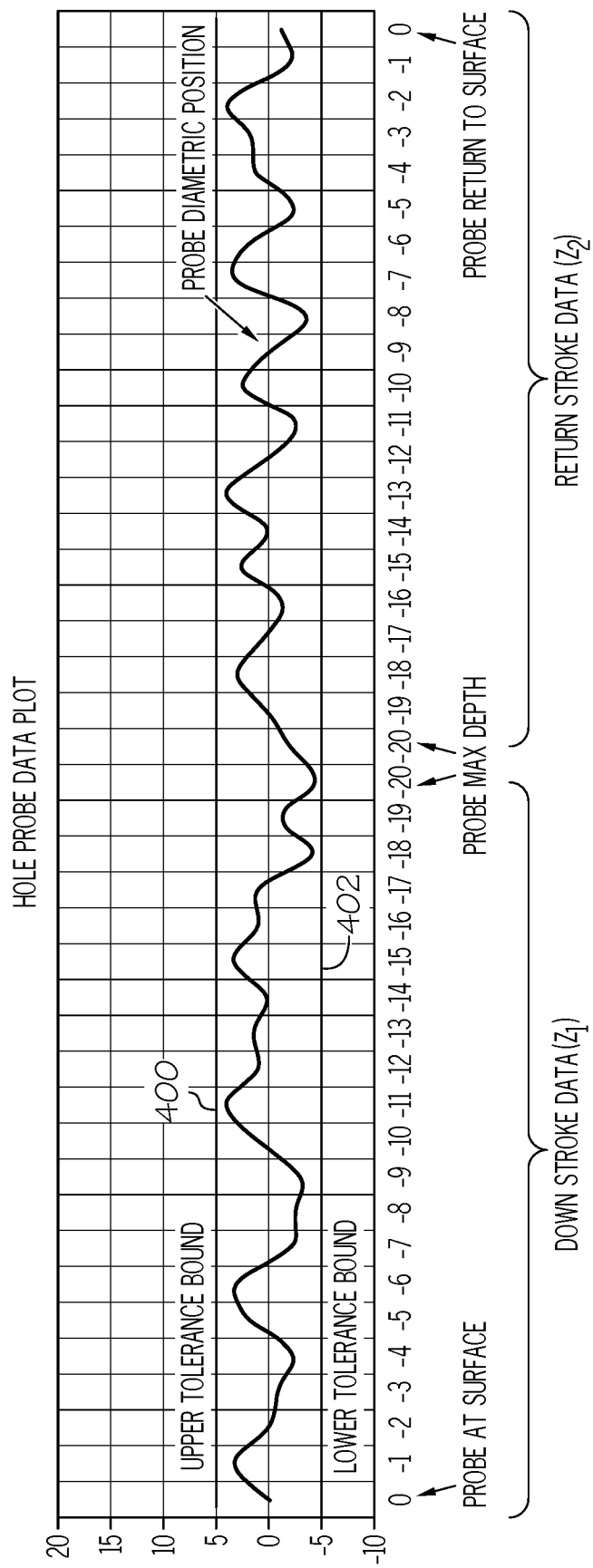
FIG. 11 is a graphical depiction of how the spatial coordinates collected by the system of FIG. 1 can be used to ascertaining whether the bore is within pre-specified tolerance limits.

At various lineal positions along the length $D_1$ of the bore 12, there may be an intended center point (based on the intended dimensions of the bore 12) and a calculated center point (based on the spatial coordinates of the contact points). The calculated center points at any particular lineal position may vary depending on whether the contact point was generated while the probe 100 was moving in a first lineal direction $Z_1$ or a second lineal direction $Z_2$, due to the rotational movement of the probe 100 (e.g., the angular position at which the contact element 102 contacts the surface 10 at a particular lineal position while moving in a first lineal direction $Z_1$ may differ from the angular position at which the same contact element 102 contacts the surface 10 at the same lineal position while moving in a second lineal direction $Z_2$). As illustrated in FIG. 11, the degree to which the calculated center points vary from the intended center points (if at all) may be ascertained to evaluate whether, at any lineal position along the length $D_1$ of the bore 12, the calculated center point exceeds either the upper tolerance limit 400 or the lower tolerance limit 402. A bore 12 that exceeds the pre-specified tolerance limits 400, 402 may be deemed non-compliant.

The center point calculations for ascertaining whether the bore 12 is within pre-specified tolerance limits 400, 402 may be performed by a computer system 119 simultaneously with the generation of a three-dimensional model 300. These calculations may also occur simultaneously with the operation of the probe.

Figure 12:
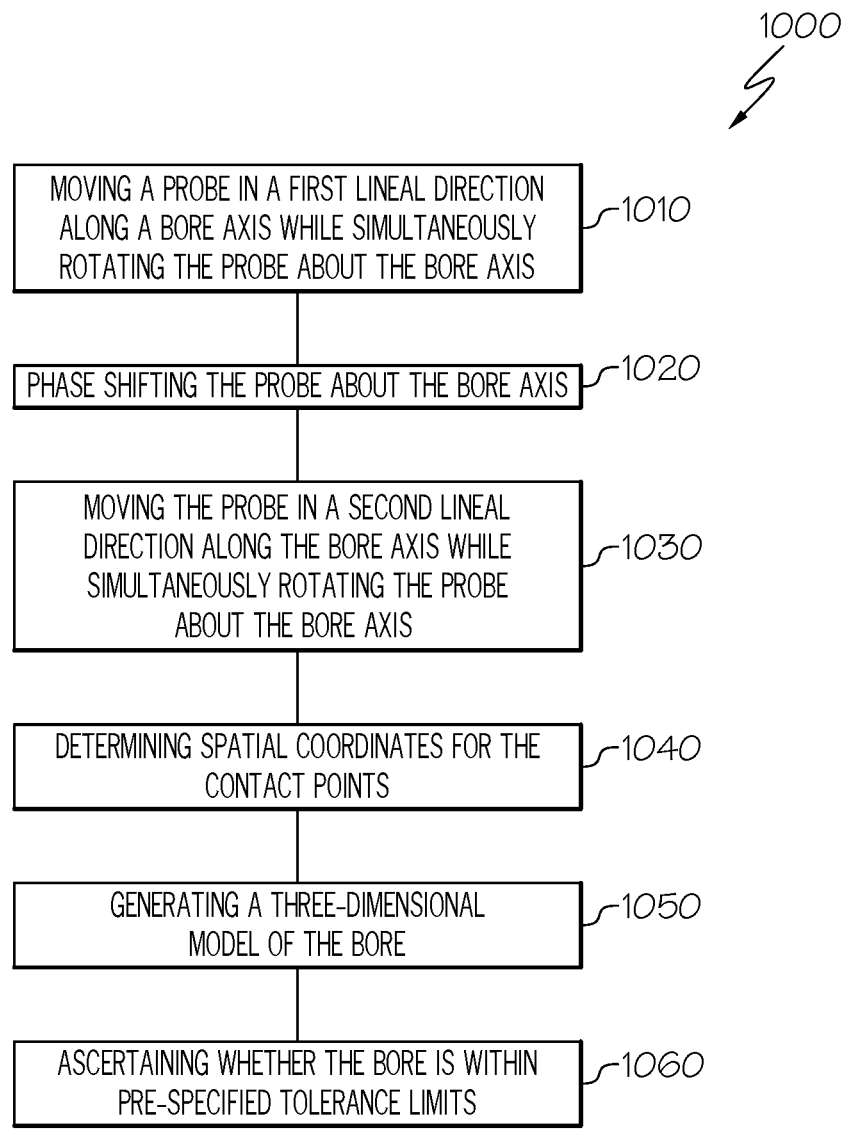
FIG. 12 is a flow diagram depicting an example of the disclosed method for evaluating a surface of a bore formed in a structure.

As illustrated in FIG. 12, an example method 1000 for evaluating a surface 10 of a bore 12 formed in a structure 14, wherein the bore 12 defines a bore axis A, is disclosed. The method 1000 includes moving a probe at least partially through the bore in a first lineal direction $Z_1$ along the bore axis A, while simultaneously rotating the probe 100 about the bore axis A (block 1010). The probe includes a contact element 102 that contacts the surface 10 of the bore 12 at a plurality of first contact points 20 as the probe 100 moves in the first lineal direction $Z_1$.

The method 1000 may include phase shifting the probe 100 about the bore axis A (block 1020). In an example, the probe 100 may be phase shifted between about 90 degrees and 180 degrees about bore axis A. Further, those skilled in the art will appreciate that phase shifting may occur during block 1010, between blocks 1010 and 1020, and/or during block 1020 without departing from the scope of the present disclosure.

After being moved in a first lineal direction $Z_1$, the method 1000 then includes moving the probe 100 at least partially through the bore 12 in a second lineal direction $Z_2$ along the bore axis A, while simultaneously rotating the probe 100 about the bore axis A (block 1030), the second lineal direction $Z_2$ being opposite the first lineal direction $Z_1$. While moving in the second lineal direction $Z_2$, the contact element 102 of the probe 100 makes contact with the surface 10 of the bore 12 at a plurality of second contact points 30.

The method 1000 may also include determining the spatial coordinates 200 of the plurality of first contact points 20 and the plurality of second contact points 30 (block 1040). Once determined, the method 1000 may include using those spatial coordinates 200 to generate a three-dimensional model 300 of the bore (block 1050). Once generated, the method 1000 may further include ascertaining whether the bore 12 is within pre-specified tolerance limits 400, 402 based on the spatial coordinates 200 of the contact points (block 1060). Those skilled in the art will appreciate that block 1050 and block 1060 may occur simultaneously with block 1040. Those skilled in the art will also appreciate that blocks 1040, 1050 and 1060 may occur simultaneously with blocks 1010, 1020 and 1030.

In an example, block 1010 may be performed by moving the probe 100 at least partially through the bore 12 in a first lineal direction $Z_1$ at a substantially constant lineal velocity. In another example, block 1030 may be performed by moving the probe 100 at least partially through the bore 12 in a second lineal direction $Z_2$ at a substantially constant lineal velocity. In yet another example, block 1010 may be performed by moving the probe 100 at least partially through the bore 12 in a first lineal direction $Z_1$ at a substantially constant lineal velocity, and then block 1030 may be performed by moving the probe 100 at least partially through the bore 12 in a second lineal direction $Z_2$ at a substantially constant lineal velocity.

In an example, block 1010 may be performed by moving the probe 100 at least partially through the bore 12 in a first lineal direction $Z_1$ while simultaneously rotating the probe 100 about bore axis A in a first angular direction $T_1$. Block 1030 may then be performed by moving the probe 100 at least partially through the bore 12 in a second lineal direction $Z_2$ while simultaneously rotating the probe 100 about bore axis A in a second angular direction $T_2$, where the second angular direction $T_2$ is opposite the first angular direction $T_1$.

In an example, the simultaneous rotation of the probe 100 in block 1010 may be performed by rotating the probe 100 about the bore axis A at a substantially constant angular velocity. In another example, the simultaneous rotation of the probe 100 in block 1030 may be performed by rotating the probe 100 about the bore axis A at a substantially constant angular velocity. In yet another example, the both simultaneous rotations in blocks 1010 and 1030 may be performed by rotating the probe 100 about bore axis A at a substantially constant angular velocity.

In an example, the simultaneous rotation of the probe 100 in block 1010 may be performed by rotating the probe 100 at least 180 degrees about bore axis A. In an example, the simultaneous rotation of the probe 100 in block 1010 may be performed by rotating the probe 100 at least 360 degrees about bore axis A. In an example, the simultaneous rotation of the probe 100 in block 1010 may be performed by rotating the probe 100 at least 720 degrees about bore axis A. In an example, the simultaneous rotation of the probe 100 in block 1030 may be performed by rotating the probe 100 at least 180 degrees about bore axis A. In an example, both simultaneous rotations of the probe 100 in blocks 1010 and 1030 may be performed by rotating the probe 100 at least 180 degrees about bore axis A.

In an example, the simultaneous lineal and angular movement of the probe 100 in block 1010 may be performed by oscillating between rotation in a first angular direction $T_1$ and rotation in a second angular direction $T_2$.

In an example, the steps shown in blocks 1010 and 1030 may be performed such that at least a majority of the plurality of first contact points 20 is different from the plurality of second contact points 30 (e.g., a majority of the plurality of first contact points 20 has an angular and lineal position that is different from the angular and lineal positions of the plurality of second contact points 30). In another example, the steps shown in blocks 1010 and 1030 may be performed such that at least a majority of the plurality of first contact points 20 is coplanar with corresponding contact points 30 of the plurality of second contact points 30 along a plane that is perpendicular to the bore axis A (e.g., the majority of the plurality of first contact points 20 has the same lineal position as a contact point of the plurality of second contact points 30). Therefore, each contact point 30 of the plurality of second contact points 30 is coplanar with a corresponding contact point 20 of the plurality of first contact points 20, the coplanarity being in planes that are perpendicular to the bore axis A. In yet another example, the steps shown in blocks 1010 and 1030 may be performed such that at least one contact point of the plurality of first contact points 20 is coplanar with another contact point of the plurality of second contact points 30 along a plane that is perpendicular to bore axis A.

In an example, the method 1000 may be performed using a probe 100 having a first contact element 102 and a second contact element 104 diametrically opposed from the first contact element 102. During block 1010, the first contact element 102 may contact the surface 10 of the bore 12 at a plurality of first contact points 20 while the second contact element 104 contacts the surface 10 of the bore 12 at a plurality of third contact points 40. Further, during block 1030, the first contact element 102 may contact the surface 10 of the bore 12 at a plurality of second contact points 30 while the second contact element 104 contacts the surface 10 of the bore 12 at a plurality of fourth contact points 50. Blocks 1040, 1050 and 1060 may also be performed by determining the spatial coordinates 200 of the pluralities of first, second, third and fourth contact points 20, 30, 40 and 50, generating a three-dimensional model 300 based on those spatial coordinates 200, and ascertaining whether the bore 12 is within pre-specified tolerance limits 400, 402.

Figure 13:
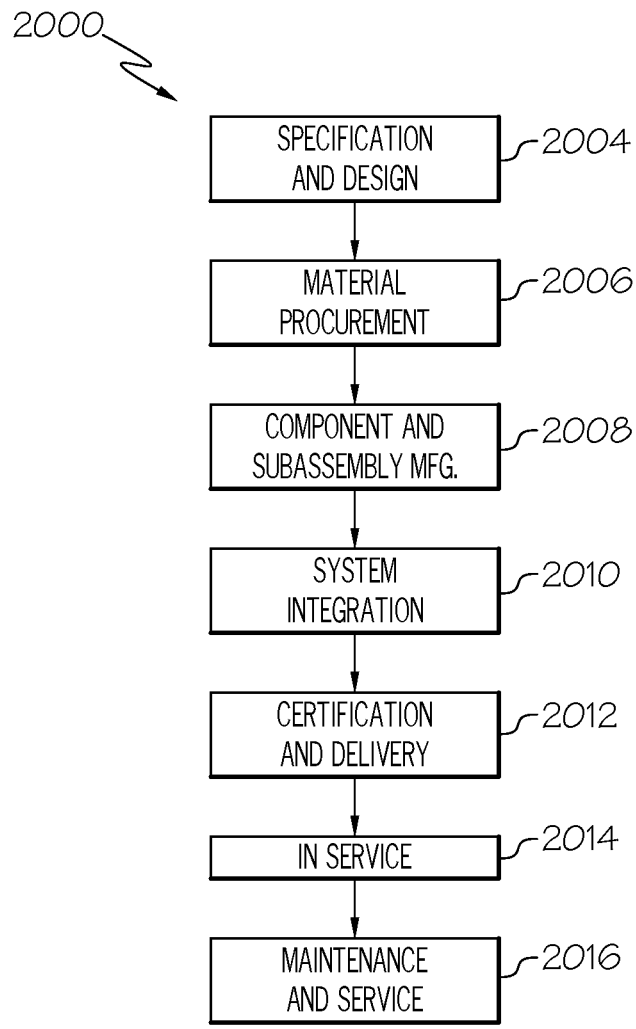
FIG. 13 is a flow diagram of an aircraft manufacturing and service methodology.
Figure 14:
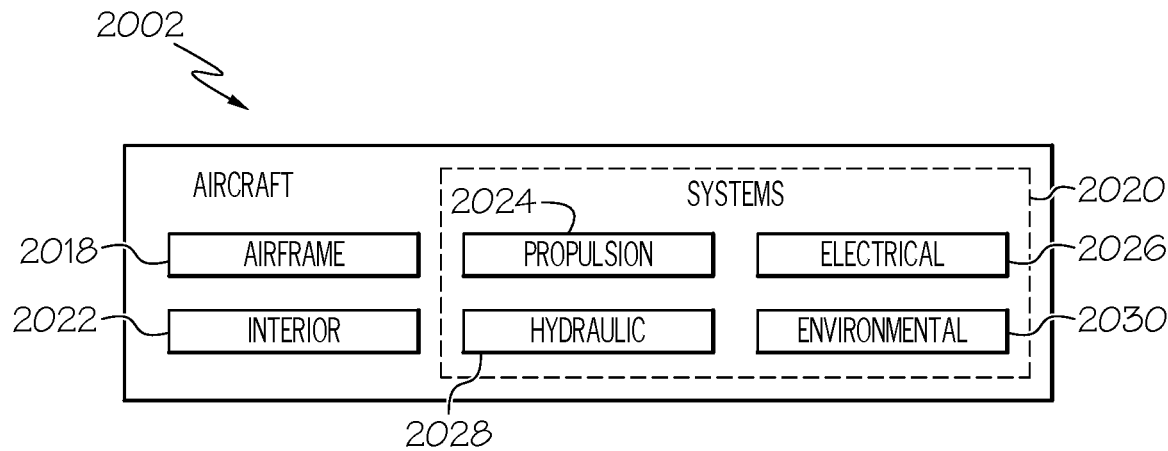
FIG. 14 is a block diagram of an aircraft

Examples of the disclosure may be described in the context of an aircraft manufacturing and service method 2000, as shown in FIG. 13, and an aircraft 2002, as shown in FIG. 14. During pre-production, the aircraft manufacturing and service method 2000 may include specification and design 2004 of the aircraft 2002 and material procurement 2006. During production, component/subassembly manufacturing 2008 and system integration 2010 of the aircraft 2002 takes place. Thereafter, the aircraft 2002 may go through certification and delivery 2012 in order to be placed in service 2014. While in service by a customer, the aircraft 2002 is scheduled for routine maintenance and service 2016, which may also include modification, reconfiguration, refurbishment and the like.

Each of the processes of method 2000 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 14, the aircraft 2002 produced by example method 2000 may include an airframe 2018 with a plurality of systems 2020 and an interior 2022. Examples of the plurality of systems 2020 may include one or more of a propulsion system 2024, an electrical system 2026, a hydraulic system 2028, and an environmental system 2030. Any number of other systems may be included.

The disclosed system and method for evaluating a surface of a bore formed in a structure may be employed during any one or more of the stages of the aircraft manufacturing and service method 2000. As one example, the disclosed system and method for evaluating a surface of a bore formed in a structure may be employed during material procurement 2006. As another example, components or subassemblies corresponding to component/subassembly manufacturing 2008, system integration 2010, and or maintenance and service 2016 may be fabricated or manufactured using the disclosed system and method for evaluating a surface of a bore formed in a structure. As another example, the airframe 2018 and the interior 2022 may be constructed using the disclosed system and method for evaluating a surface of a bore formed in a structure. Also, one or more apparatus examples, method examples, or a combination thereof may be utilized during component/subassembly manufacturing 2008 and/or system integration 2010, for example, by substantially expediting assembly of or reducing the cost of an aircraft 2002, such as the airframe 2018 and/or the interior 2022. Similarly, one or more of system examples, method examples, or a combination thereof may be utilized while the aircraft 2002 is in service, for example and without limitation, to maintenance and service 2016.

The disclosed system and method for evaluating a surface of a bore formed in a structure are described in the context of an aircraft; however, one of ordinary skill in the art will readily recognize that the disclosed system and method for evaluating a surface of a bore formed in a structure may be utilized for a variety of applications. For example, the disclosed system and method for evaluating a surface of a bore formed in a structure may be implemented in various types of vehicles including, e.g., helicopters, passenger ships, automobiles and the like.

Although various examples of the disclosed systems and methods for evaluating a surface of a bore formed in a structure have been shown and described, modifications may occur to those skilled in the art upon reading the specification. The present application includes such modifications and is limited only by the scope of the claims.

What is claimed is:

1. A method for evaluating a surface of a bore formed in a structure, said bore defining a bore axis, said method comprising:
   moving a probe at least partially through said bore in a first lineal direction along said bore axis while simultaneously rotating said probe about said bore axis A, said probe defining an internal volume, said probe comprising a biasing element and a contact element at least partially received within said internal volume, said contact element contacting said surface of said bore at a plurality of first contact points as said probe moves in said first lineal direction.

2. The method of claim 1 wherein said moving said probe at least partially through said bore in said first lineal direction comprises moving said probe at a substantially constant lineal velocity.

3. The method of claim 1 wherein said moving said probe at least partially through said bore in said first lineal direction along said bore axis while simultaneously rotating said probe about said bore axis comprises rotating said probe at a substantially constant angular velocity.

4. The method of claim 1 wherein said moving said probe at least partially through said bore in said first lineal direction along said bore axis while simultaneously rotating said probe about said bore axis comprises rotating said probe at least 360 degrees about said bore axis.

5. The method of claim 1 wherein said moving said probe at least partially through said bore in said first lineal direction along said bore axis while simultaneously rotating said probe about said bore axis comprises oscillating between rotation in a first angular direction and rotation in a second angular direction.

6. The method of claim 1 further comprising determining spatial coordinates for said plurality of first contact points.

7. The method of claim 6 further comprising generating a three-dimensional model of said surface of said bore based on said spatial coordinates.

8. The method of claim 7 further comprising ascertaining whether said bore is within pre-specified tolerance limits, based on said spatial coordinates.

9. The method of claim 1 further comprising moving said probe at least partially through said bore in a second lineal direction along said bore axis while simultaneously rotating said probe about said bore axis, said second lineal direction being opposite of said first lineal direction, said contact element contacting said surface of said bore at a plurality of second contact points as said probe moves in said second lineal direction.

10. The method of claim 9 wherein each contact point of said plurality of second contact points is coplanar with a corresponding contact point of said plurality of first contact points, said coplanarity being perpendicular to said bore axis.

11. The method of claim 9 wherein:
   said moving said probe at least partially through said bore in said first lineal direction along said bore axis while simultaneously rotating said probe about said bore axis comprises rotating said probe in a first angular direction about said bore axis, and
   said moving said probe at least partially through said bore in said second lineal direction along said bore axis while simultaneously rotating said probe about said bore axis comprises rotating said probe in a second angular direction about said bore axis, said second angular direction being opposite said first angular direction.

12. The method of claim 9 wherein said moving said probe at least partially through said bore in said second lineal direction along said bore axis while simultaneously rotating said probe about said bore axis comprises rotating said probe at least 180 degrees about said bore axis.

13. The method of claim 9 further comprising phase shifting said probe about said bore axis after said moving said probe at least partially through said bore in said first lineal direction, but prior to said moving said probe at least partially through said bore in said second lineal direction.

14. The method of claim 13 wherein said phase shifting said probe comprises rotating said probe between about 90 degrees and 180 degrees about said bore axis.

15. The method of claim 9 wherein said contact element is a first contact element, wherein said probe further comprises a second contact element diametrically opposed from said first contact element, and wherein:
   said second contact element contacts said surface of said bore at a plurality of third contact points as said probe moves in said first lineal direction, and said second contact element contacts said surface of said bore at a plurality of fourth contact points as said probe moves in said second lineal direction.

16. A method for evaluating a surface of a bore formed in a structure, said bore defining a bore axis, said method comprising:
  moving a probe at least partially through said bore in a first lineal direction along said bore axis while simultaneously rotating said probe at least 360 degrees about said bore axis, said probe defining an internal volume, said probe comprising a biasing element and a contact element at least partially received within said internal volume, said contact element contacting said surface of said bore at a plurality of first contact points as said probe moves in said first lineal direction;
  phase shifting said probe about said bore axis after said moving said probe at least partially through said bore in said first lineal direction; and
  after said phase shifting, moving said probe at least partially through said bore in a second lineal direction along said bore axis while simultaneously rotating said probe at least 360 degrees about said bore axis, said second lineal direction being opposite of said first lineal direction, said contact element contacting said surface of said bore at a plurality of second contact points as said probe moves in said second lineal direction.

17. A system for evaluating a surface of a bore formed in a structure, said bore defining a bore axis, said system comprising:
  a probe insertable into said bore, said probe defining an internal volume, said probe comprising a biasing element and a contact element at least partially received within said internal volume, said contact element positioned to contact said surface when said probe is inserted into said bore; and
  a carriage assembly connected to said probe, wherein said carriage assembly is adapted for linear movement along said bore axis and rotational movement about said bore axis.

18. The system of claim 17 wherein said probe is a plug gauge.

19. The system of claim 18 wherein said plug gauge comprises:
  a housing defining said internal volume and comprising an opening into said internal volume;
  a plunger at least partially received in said internal volume, said plunger being biased into engagement with said contact element to urge said contact element radially outward from said housing through said opening; and
  a sensor sensing movement of said plunger relative to said housing.

20. The system of claim 19 wherein said plug gauge further comprises a second contact element at least partially received in a second opening in said housing, said second contact element being diametrically opposed from said contact element, wherein said plunger is biased into engagement with said second contact element to urge said second contact element radially outward from said housing through said second opening.

* * * * *